United States Patent
Hong (10) Patent No.: US 11,647,425 B2
(45) Date of Patent: May 9, 2023

(54) METHODS AND DEVICES FOR REDUCING TEMPERATURE FOR USER EQUIPMENT

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 132 days.

(21) Appl. No.: 17/386,734

(22) Filed: Jul. 28, 2021

(65) Prior Publication Data
US 2021/0360489 A1 Nov. 18, 2021

Related U.S. Application Data

(63) Continuation of application No. 16/679,401, filed on Nov. 11, 2019, now Pat. No. 11,109,281, which is a
(Continued)

(51) Int. Cl.
*H04W 4/00* (2018.01)
*H04W 36/00* (2009.01)
(Continued)

(52) U.S. Cl.
CPC ........ *H04W 36/0011* (2013.01); *H04W 36/08* (2013.01); *H04W 36/24* (2013.01);
(Continued)

(58) Field of Classification Search
CPC . H04W 36/0011; H04W 76/27; H04W 76/10; H04W 36/08; H04W 36/24;
(Continued)

(56) References Cited

U.S. PATENT DOCUMENTS 10,080,173 B1 * 9/2018 Rai .................... H04L 43/08

FOREIGN PATENT DOCUMENTS

| CN | 101064943 A | 10/2007 |
|---|---|---|
| CN | 101753658 A | 6/2010 |

(Continued)

OTHER PUBLICATIONS

International Search Report of PCT Application No. PCT/CN2017/084948, dated Dec. 27, 2017, issued by the State Intellectual Property Office of the P.R. China.
(Continued)

*Primary Examiner* — Marcos Batista
(74) *Attorney, Agent, or Firm* — Finnegan, Henderson, Farabow, Garrett & Dunner, L.L.P.

(57) ABSTRACT

A method for reducing temperature for user equipment (UE), includes: receiving a handover request from a source base station, wherein the handover request carries at least one of configuration information expected by the UE and indication information indicating that the UE overheats; and sending first configuration information to the UE based on the handover request, wherein the first configuration information is configured for the UE to update its own radio communication parameter configuration to reduce the temperature of the UE, and the first configuration information is the same as or different from the configuration information expected by the UE.

14 Claims, 8 Drawing Sheets

Related U.S. Application Data continuation of application No. PCT/CN2017/084948, filed on May 18, 2017.

(51) Int. Cl.
  *H04W 76/27* (2018.01)
  *H04W 76/10* (2018.01)
  *H04W 36/08* (2009.01)
  *H04W 36/24* (2009.01)
  *H04W 92/20* (2009.01)

(52) U.S. Cl.
  CPC .......... *H04W 76/10* (2018.02); *H04W 76/27* (2018.02); *H04W 92/20* (2013.01)

(58) Field of Classification Search
  CPC . H04W 92/20; H04W 36/0072; H04W 28/18; G06F 1/206; G06F 1/3206; G06F 1/203; H04L 41/082; H04L 41/0823
  USPC .......................................... 370/331; 455/312
  See application file for complete search history.

(56) References Cited

FOREIGN PATENT DOCUMENTS

| | | |
|---|---|---|
| CN | 101938819 A | 1/2011 |
| CN | 102176782 A | 9/2011 |
| CN | 102186227 A | 9/2011 |
| CN | 102422682 A | 4/2012 |
| CN | 102740385 | 10/2012 |
| CN | 102918912 | 2/2013 |
| CN | 103621149 A | 3/2014 |
| CN | 106655536 A | 5/2017 |
| EP | 2 312 759 A1 | 4/2011 |
| EP | 2 995 163 | 3/2016 |
| EP | 3 125 611 A1 | 2/2017 |
| JP | 2010119028 A | 5/2010 |
| JP | 2015026996 A | 2/2015 |
| WO | WO 2014/182229 A1 | 11/2014 |

OTHER PUBLICATIONS

First Office Action dated Feb. 11, 2019, in counterpart Chinese Application No. 201780000386.8 and English translation thereof.
Second Office Action dated Apr. 30, 2019, in counterpart Chinese Application No. 201780000386.8 and English translation thereof.
Extended European Search Report of counterpart EP Application No. 17909713.4 dated Oct. 15, 2020.

\* cited by examiner

METHODS AND DEVICES FOR REDUCING TEMPERATURE FOR USER EQUIPMENT

CROSS-REFERENCE TO RELATED APPLICATION

The present application is a continuation application of U.S. application Ser. No. 16/679,401, filed on Nov. 11, 2019, which is a continuation application of International Application No. PCT/CN2017/084948, filed on May 18, 2017, the entire contents of both of which are incorporated herein by reference.

TECHNICAL FIELD

The present disclosure relates to the field of communication technology and, in particular, to methods and devices for reducing temperature for user equipment (UE).

BACKGROUND

With the development of mobile communication technologies, a user demands more and more on a transmission rate. Long term evolution (LTE) UE can obtain an ultrahigh transmission rate by configuring high-order multiple-input multi-output (MIMO), multi-carrier aggregation, high-order modulation and coding or the like to meet the user's demand for a high rate.

However, these technologies that bring about high-rate transmission may cause the UE to overheat.

SUMMARY

The present disclosure provides methods and devices for reducing temperature for user equipment (UE).

According to a first aspect of the present disclosure, there is provided a method for reducing temperature for UE. The method includes: receiving a handover request from a source base station, wherein the handover request carries at least one of configuration information expected by the UE and indication information indicating that the UE overheats; and sending first configuration information to the UE based on the handover request, wherein the first configuration information is configured for the UE to update its own radio communication parameter configuration to reduce the temperature of the UE, and the first configuration information is the same as or different from the configuration information expected by the UE.

According to a second aspect of the present disclosure, there is provided a method for reducing temperature for UE. The method includes: receiving first configuration information from a target base station; and updating radio communication parameter configuration of the UE based on the first configuration information to reduce the temperature of the UE.

According to a third aspect of the present disclosure, there is provided a first base station, including: a processor; and a memory configured to store an instruction executable by the processor, wherein the processor is configured to: receive a handover request from a second base station as a source base station, wherein the handover request carries at least one of configuration information expected by UE and indication information indicating that the UE overheats; and send first configuration information to the UE based on the handover request, wherein the first configuration information is configured for the UE to update its own radio communication parameter configuration to reduce the temperature of the UE, and the first configuration information is the same as or different from the configuration information expected by the UE.

According to a fourth aspect of the present disclosure, there is provided user equipment (UE), including: a processor; and a memory configured to store an instruction executable by the processor, wherein the processor is configured to: receive first configuration information from a target base station; and update radio communication parameter configuration of the UE based on the first configuration information to reduce the temperature of the UE.

According to a fifth aspect of the present disclosure, there is provided a computer-readable storage medium with a computer program stored thereon, wherein the method for reducing temperature for the UE is implemented when the computer program is executed by the processor.

According to a sixth aspect of the present disclosure, there is provided a computer-readable storage medium with a computer program stored thereon, wherein the method for reducing temperature for the UE is implemented when the computer program is executed by the processor.

The technical solutions provided by the embodiments of the present disclosure may have the following beneficial effects.

Because the handover request is received from the source base station, and the first configuration information is sent to the UE based on information carried in the handover request, the temperature of the UE can be reduced after the UE updates its own radio communication parameter configuration based on the first configuration information. Thus, problems caused by overheating of the UE can be avoided.

Because the first configuration information sent by the target base station is received, and the radio communication parameter configuration of the UE is updated based on the first configuration information to reduce temperature for the UE, problems caused by overheating of the UE can be avoided.

It is to be understood that both the foregoing general description and the following detailed description are exemplary and explanatory only and are intended to limit the present disclosure.

DETAILED DESCRIPTION

The present disclosure will be described in detail below in combination with the accompanying drawings. The described embodiments are merely exemplary embodiments, rather than all embodiments consistent with the present disclosure. Based on the embodiments of the present disclosure, all other embodiments derived by a person of ordinary skill in the art without creative efforts shall fall within the protection scope of the present disclosure.

Figure 1:
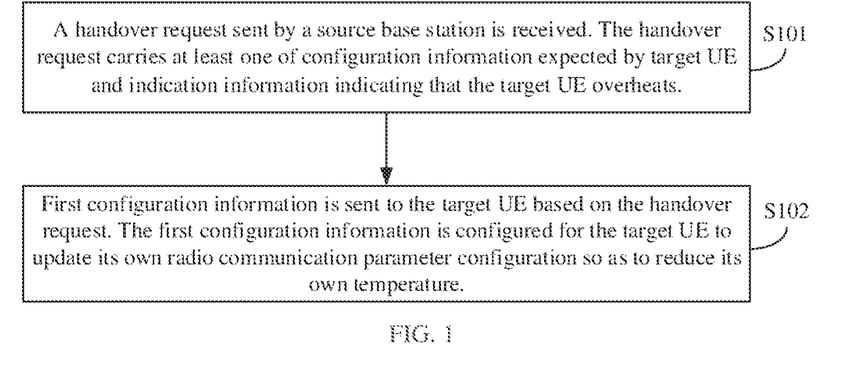
FIG. 1 is a flow chart of a method for reducing temperature for UE in accordance with an exemplary embodiment.

FIG. 1 is a flow chart of a method for reducing temperature for UE in accordance with an exemplary embodiment of the present disclosure. The method may be performed by a target base station. As shown in FIG. 1. the method may include the following steps.

In step S101, a handover request sent by a source base station is received. The handover request carries at least one of configuration information expected by target UE and indication information indicating that the target UE overheats.

After the source station receives a measurement signal reported by the target UE, the handover request is sent to a target base station if it is determined that the target UE requires handover of the base station.

In this embodiment, before execution of step S101, the source base station may interact with other base stations available for handover to inform the other base stations whether it has the ability to reduce temperature for the UE by updating the configuration information. For example, when a base station sets up an X2 interface (namely, an interface between the base stations), capability information indicating whether the base station can reduce temperature for the UE by updating the configuration information or not may be carried in an X2 interface setup request and an X2 interface setup response.

Supposing that the source base station has the ability to reduce temperature for the UE, the source base station can choose a base station that has the ability to reduce temperature for the UE from other base stations available for handover as the target base station. In addition, after it is determined that both of the base stations have the ability to reduce temperature for the UE, the handover request sent by the source base station may carry at least one of the configuration information expected by the target UE and the indication information indicating that the target UE overheats. If the source base station, but not the target base station, has the ability to reduce temperature for the UE, the handover request sent by the source station does not carry at least one of the configuration information expected by the target UE and the indication information indicating that the target UE overheats.

Overheating of the target UE may present in various forms, including but not limited to the temperature of the UE being higher than a preset temperature, the temperature of the UE being higher than the preset temperature and lasting for a period of time, etc.

In step S102, first configuration information is sent to the target UE based on the handover request. The first configuration information is configured for the target UE to update its own radio communication parameter configuration so as to reduce its own temperature. The first configuration information may be the same as or different from the configuration information expected by the target UE.

If the handover request carries the configuration information expected by the target UE, the target base station can send the first configuration information to the target UE after receiving the handover request. The first configuration information may be the configuration information expected by the target UE and may also be new configuration information generated by the target base station with reference to the configuration information expected by the target UE, i.e., the first configuration information is different from the configuration information expected by the target UE. The target UE can update its own radio communication parameter configuration and reduce its own temperature after receiving the first configuration information. Thus, such problems as service interruption or UE restart caused by overheating of the UE may be avoided.

If the handover request only carries the indication information indicating that the target UE overheats, the target base station may send the first configuration information to the target UE after receiving the handover request. The radio communication parameter configuration identified by the first configuration information is lower than the radio communication parameter configuration obtained before the target UE receives the first configuration information. In this way, the temperature of the target UE can be reduced after target UE updates radio communication parameter configuration based on the received first configuration information. Thus, such problems as service interruption or UE restart caused by overheating of the UE may be avoided.

In the foregoing embodiment, the handover request sent by the source base station is received, and the first configuration information is sent to the target UE based on information carried in the handover request, such that the temperature of the target UE can be reduced after the target UE updates its own radio communication parameter configuration based on the first configuration information. Thus, problems caused by overheating of the UE may be avoided.

Figure 2:
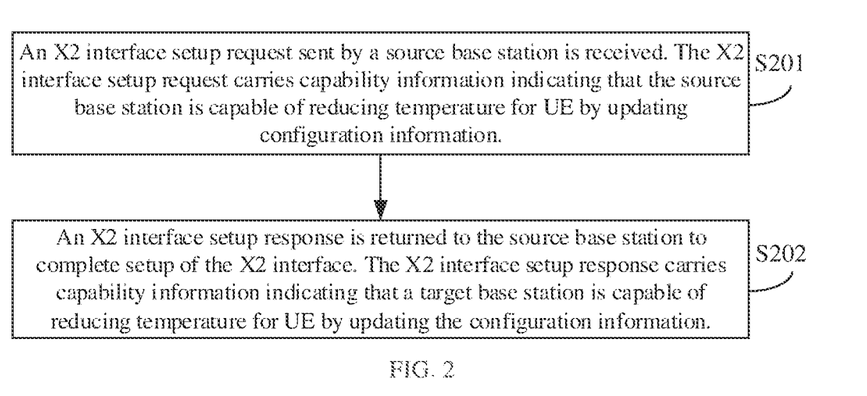
FIG. 2 is a flow chart of a method for reducing temperature for UE in accordance with an exemplary embodiment.

FIG. 2 is a flow chart of a method for reducing temperature for UE in accordance with an exemplary embodiment of the present disclosure. As shown in FIG. 2, before the step S101, the method may further include the following steps.

In step S201, an X2 interface setup request sent by a source base station is received. The X2 interface setup request carries capability information indicating that the source base station is capable of reducing temperature for the UE by updating configuration information.

In this embodiment, the source base station can send the X2 interface setup request to a target base station. The X2 interface setup request carries the capability information indicating that the source base station is capable of reducing temperature for the UE by updating the configuration information.

In step S202, an X2 interface setup response is returned to the source base station to complete setup of the X2 interface. The X2 interface setup response carries capability information indicating that a target base station is capable of reducing temperature for the UE by updating the configuration information.

After receiving the X2 interface setup request, the target base station extracts the capability information indicating that the source base station is capable of reducing temperature for the UE by updating the configuration information from the received X2 interface setup request and returns the X2 interface setup response to the source base station. The X2 interface setup response carries the capability information indicating that the target base station is capable of reducing temperature for the UE by updating the configuration information. So far, both of the source base station and the target base station can learn about whether the other party has the ability to reduce temperature for the UE by updating the configuration information.

In the foregoing embodiment, the X2 interface setup request sent by the source base station is received to learn about that the source base station has the ability to reduce temperature for the UE by updating the configuration information based on the capability information carried. in the X2 interface setup request. Meanwhile, the X2 interface setup response is returned to the source base station, such that the source base station can learn about that the target base station has the ability to reduce temperature for the UE by updating the configuration information based on the capability information carried in the X2 interface setup response. Thus, a condition is provided for subsequently transmitting the first configuration information to the target UE so as to reduce temperature for the target UE.

Figure 3:
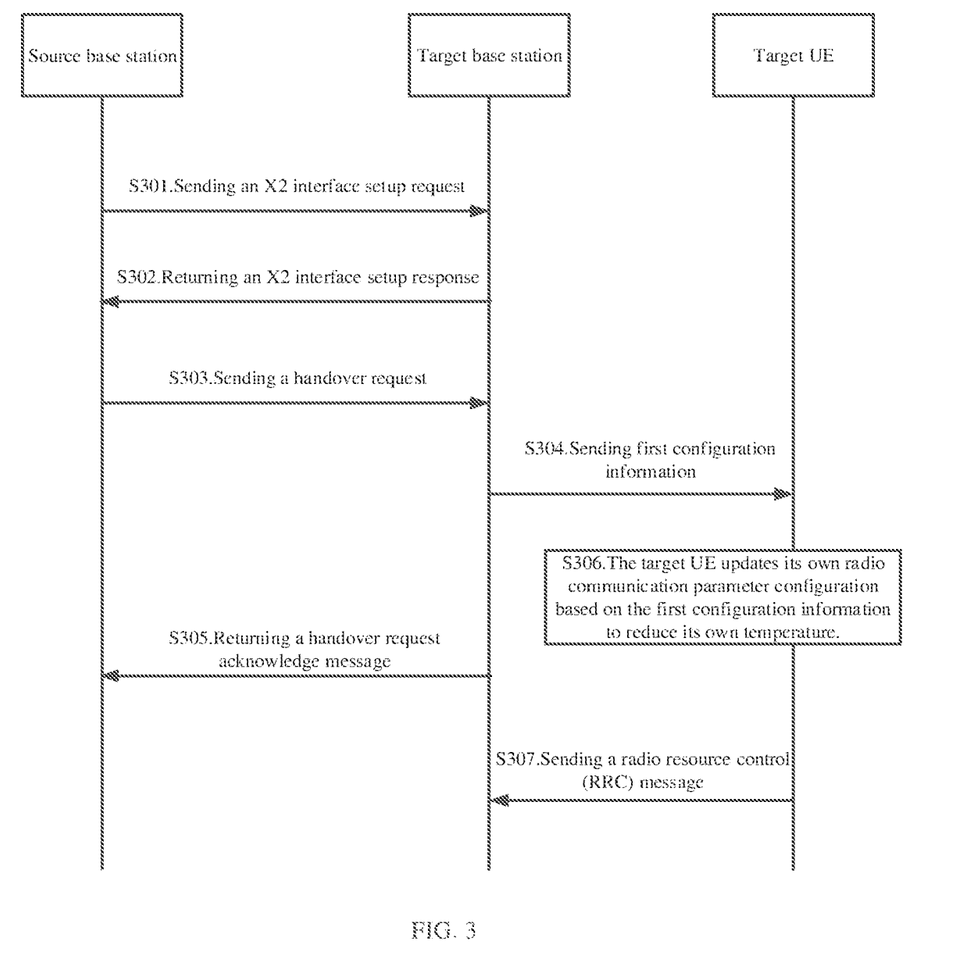
FIG. 3 is a flow chart of a method for reducing temperature for UE in accordance with an exemplary embodiment.

FIG. 3 is a flow chart of a method for reducing temperature for UE in accordance with an exemplary embodiment. The method may be performed by interaction among a source base station, a target base station and a target UE. As shown in FIG. 3, the method may include the following steps.

In step S301, a source base station sends an X2 interface setup request to a target base station. The X2 interface setup request carries capability information indicating that the source base station is capable of reduce temperature for the UE by updating configuration information.

It step S302, after receiving the X2 interface setup request, the target base station resolves the capability information indicating that the source base station is capable of reduce temperature for the UE by updating the configuration information from the X2 interface setup request, and returns an X2 interface setup response to the source base station to complete setup of the X2 interface. The X2 interface setup response carries capability information indicating that a target base station is capable of reduce temperature for the UE by updating configuration information.

In step S303, the source base station sends a handover request to the target base station through the X2 interface. The handover request caries at least one of configuration information expected by the target UE and indication information indicating that the target UE overheats.

During handover of the overheated target UE, the source base station may send information reported by the overheated target UE to the target base station through the X2 interface. The information reported by the overheated target UE may include but not limited to at least one of the configuration information expected by the target UE and the indication information indicating that the target UE overheats.

In step S304, the target base station sends first configuration information to the target UE based on the handover request.

If the target base station supports and agrees that overheating of the target UE may be solved by updating the configuration after receiving a handover request acknowledge message, the first configuration information may be sent to the target UE.

In step S305, the target base station returns the handover request acknowledge message that carries the first configuration information to the source base station.

After sending the first configuration information to the target UE, the target base station may inform the source base station of the configuration by the target base station to the overheated target UE through the handover request acknowledge message.

In step S306, the target UE updates its own radio communication parameter configuration based on the first configuration information to reduce its own temperature.

In step S307, the target UE sends a radio resource control (RRC) message to the target base station if it is detected that the target UE does not overheat. The RRC message carries identification information indicating that the target UE does not overheat.

After the problem of overheating is solved, the target UE may send the identification information indicating that the target UE does not overheat to the target base station through the RRC message to inform the target base station that the problem of overheating is solved.

In the foregoing embodiment, through interaction among the source base station, the target base station and the target UE, the overheated target UE may update its own radio communication parameter configuration based on the first configuration information sent by the target base station. Thus, the target UE may not overheat immediately after the handover is completed.

Figure 4:
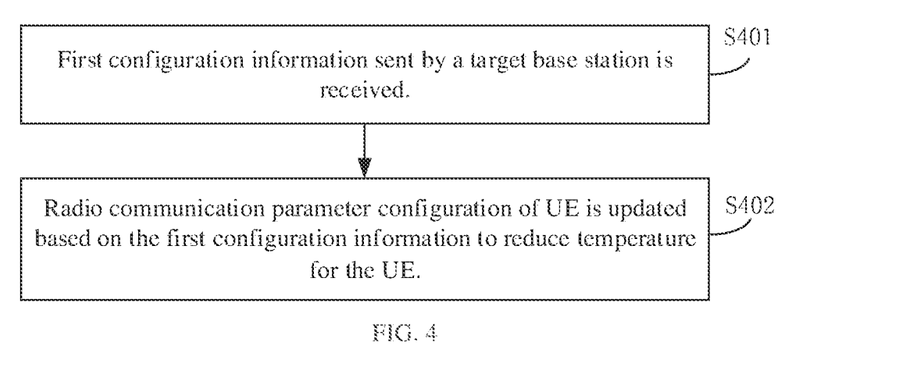
FIG. 4 is a flow chart of a method for reducing temperature for UE in accordance with an exemplary embodiment.

FIG. 4 is a flow chart of a method for reducing temperature for UE in accordance with an exemplary embodiment of the present disclosure. The method may be performed by the UE. As shown in FIG. 4, the method may include the following steps.

In step S401, first configuration information sent by a target base station is received.

The target base station may send the first configuration information to target UE based on information carried in a handover request after receiving the handover request sent by a source base station.

It step S402, radio communication parameter configuration of the UE is updated based on the first configuration information to reduce temperature for the UE.

The target UE may update its own radio communication parameter configuration and reduce its own temperature after receiving the first configuration information. Thus, such problems as service interruption or UE restart caused by overheating of the UE may be avoided.

In the foregoing embodiment, the first configuration information sent by the target base station is received, and the radio communication parameter configuration of the UE is updated based on the first configuration information to reduce temperature for the UE, such that problems caused by overheating of the UE may be avoided.

Figure 5:
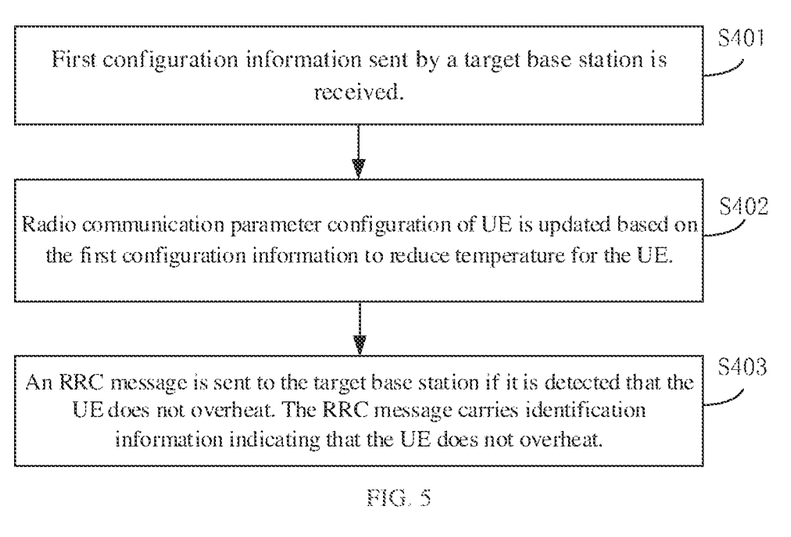
FIG. 5 is a flow chart of a method for reducing temperature for UE in accordance with an exemplary embodiment.

FIG. 5 is a flow chart of a method for reducing temperature for UE in accordance with an exemplary embodiment of the present disclosure. As shown in FIG. 5, after the step S402, the method for temperature reduction of the UE may further include the following steps.

In step S403, an RRC message is sent to the target base station if it is detected that the UE does not overheat. The RRC message carries identification information indicating that the UE does not overheat.

Non-overheating of the target UE may present in various forms. For example, the temperature of the UE is lower than a preset temperature, or the temperature of the UE is lower than the preset temperature and lasts for a period of time.

In the embodiment, after it is detected that the UE does not overheat, the identification information indicating that the UE does not overheat may be sent to the target base station through the RRC message to inform the target base station that the problem of overheating is solved.

Figure 6:
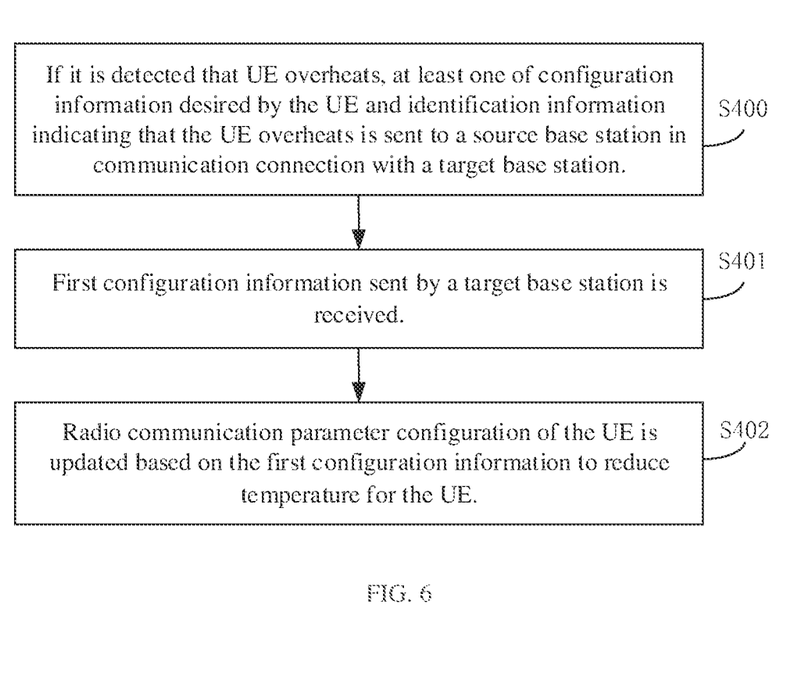
FIG. 6 is a flow chart of a method for reducing temperature for UE in accordance with an exemplary embodiment.

FIG. 6 is a block diagram of a method for reducing temperature for UE in accordance with an exemplary embodiment of the present disclosure. As shown in FIG. 6, before the step S401, the method may further include the following step.

In step S400, if it is detected that UE overheats, at least one of configuration information expected by the UE and identification information indicating that the UE overheats is sent to a source base station in communication connection with a target base station.

Overheating of the target UE may present in various forms. For example, the temperature of the UE is higher than a preset temperature, or the temperature of the UE is higher than the preset temperature and lasts for a period of time.

In the embodiment, after it is detected that the UE overheats, at least one of the configuration information expected by the UE and the identification information indicating that the UE overheats may be sent to the source base station, such that when the source base station sends the handover request to the target base station, a handover request may carry at least one of the configuration information expected by the UE and identification information indicating that the UE overheats. Thus, a condition is provided for the target base station to send the first configuration information to the UE so as to reduce temperature for the UE.

Figure 7:
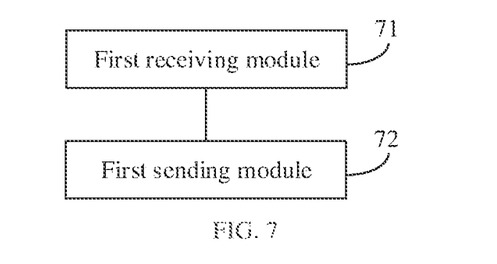
FIG. 7 is a block diagram of a device for reducing temperature for UE in accordance with an exemplary embodiment.

FIG. 7 is a block diagram of a device for reducing temperature for UE in accordance with an exemplary embodiment. As shown in FIG. 7, the device includes a first receiving module 71 and a first sending module 72.

The first receiving module 71 is configured to receive a handover request sent by a source base station. The handover request carries at least one of configuration information expected by target UE and indication information indicating that the target UE overheats.

After the source base station receives a measurement signal reported by the target UE, the handover request is sent to a target base station if it is determined that the target UE requires handover of the base station.

In this embodiment, before the first receiving module 71 receives the handover request sent by the source base station, the source base station may interact with other base stations available for handover to inform the other base stations whether it has the ability to reduce temperature for the UE by updating the configuration information. For example, when the base station sets up an X2 interface (namely, an interface between the base stations), capability information indicating whether the base station can reduce temperature for the UE by updating the configuration information or not may be carried in an X2 interface setup request and an X2 interface setup response.

Supposing that the source base station has the ability to reduce temperature for the UE, the source base station can choose a base station that has the ability to reduce temperature for the UE from other base stations available for handover as the target base station. In addition, after it is determined that both of the base stations have the ability to reduce temperature for the UE, the handover request sent by the source base station can carry at least one of the configuration information expected by the target UE and the indication information indicating that the target UE overheats. If the source base station but not the target base station has the ability to reduce temperature for the UE, the handover request sent by the source station does not carry at least one of the configuration information expected by the target UE and the indication information indicating that the target UE overheats.

Overheating of the target UE may present in various forms, including but not limited to the temperature of the UE being higher than a preset temperature, the temperature of the UE being higher than the preset temperature and lasts for a period of time, etc.

The first sending module 72 is configured to send first configuration information to the target UE based on the handover request received by the first receiving module 71. The first configuration information is configured for the target UE to update its own radio communication parameter configuration so as to reduce its own temperature. The first configuration information is the same as or different from the configuration information expected by the target UE If the handover request carries the configuration information expected by the target UE, the target base station can send the first configuration information to the target UE after receiving the handover request. The first configuration information may be the configuration information expected by the target UE and may also be new configuration information generated by the target base station with reference to the configuration information expected by the target UE, i.e., the first configuration information is different from the configuration information expected by the target UE. The target UE may update its own radio communication parameter configuration and reduce its own temperature after receiving the first configuration information. Thus, such problems as service interruption or UE restart caused by overheating of the UE may be avoided.

If the handover request only carries the indication information indicating that the target UE overheats, the target base station may send the first configuration information to the target UE after receiving the handover request. The radio communication parameter configuration identified by the first configuration information is lower than the radio communication parameter configuration obtained before the target UE receives the first configuration information. In this way, the temperature of the target UE can be reduced after the target UE updates its own radio communication parameter configuration based on the received first configuration information. Thus, such problems as service interruption or UE restart caused by overheating of the UE may be avoided.

In the foregoing embodiment, the handover request sent by the source base station is received, and the first configuration information is sent to the target UE based on information carried in the handover request, such that the temperature of the target UE can be reduced after the target UE updates its own radio communication parameter configuration based on the first configuration information. Thus, problems caused by overheating of the UE may be avoided.

Figure 8A:
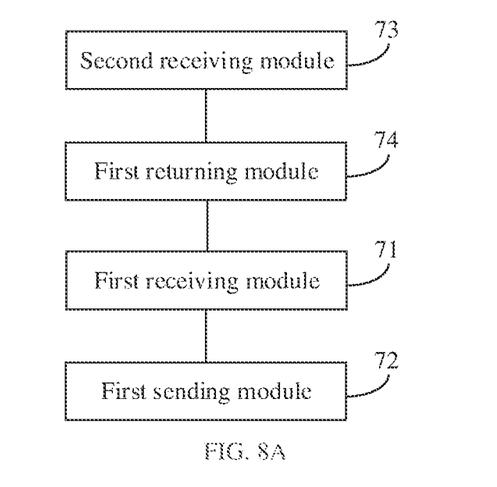
FIG. 8A is a block diagram of a device for reducing temperature for UE in accordance with an exemplary embodiment.

FIG. 8A is a block diagram of a device for reducing temperature for UE in accordance with an exemplary embodiment. As shown in FIG. 8A, based on the embodiment shown in FIG. 7, the device may further include a second receiving module 73 and a first returning module 74.

The second receiving module 73 is configured to, before the first receiving module 71 receives the handover request sent by the source base station, receive an X2 interface setup request sent by the source base station. The X2 interface setup request carries capability information indicating that the source base station is capable of reducing temperature for the UE by updating the configuration information.

It this embodiment, the source base station can send the X2 interface setup request to a target base station. The X2 interface setup request carries the capability information indicating that the source base station is capable of reducing temperature for the UE by updating the configuration information.

The first returning module 74 is configured to return an X2 interface setup response of the X2 interface building request received by the second receiving module to the source base station to complete setup of an X2 interface. The X2 interface setup request carries capability information indicating that a target base station is capable of reducing temperature for the UE by updating the configuration information.

After receiving the X2 interface setup request, the target base station extracts the capability information indicating that the source base station is capable of reducing temperature for the UE by updating the configuration information from the received X2 interface setup request and returns the X2 interface setup response to the source base station. The X2 interface setup response carries the capability information indicating that the target base station is capable of reducing temperature for the UE by updating the configuration information. So far, both of the source base station and the target base station learn about whether the other party has the ability to reduce temperature for the UE by updating the configuration information.

In the foregoing embodiment, the X2 interface setup request sent by the source base station is received to learn about that the source base station has the ability to reduce temperature for the UE by updating the configuration information based n the capability information carried in the X2 interface setup request. Meanwhile, the X2 interface setup response is returned to the source base station, such that the source base station can learn about that the target base station has the ability to reduce temperature for the UE by updating the configuration information based on the capability information caroled in the X2 interface setup response. Thus, a condition is provided for subsequently transmitting the first configuration information to the target UE so as to reduce temperature for the target UE.

Figure 8B:
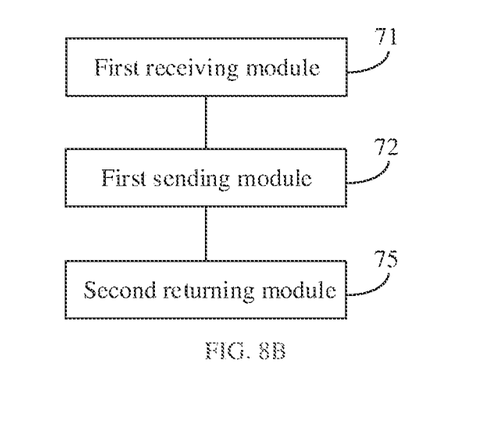
FIG. 8B is a block diagram of a device for reducing temperature for UE in accordance with an exemplary embodiment.

FIG. 8B is a block diagram of a device for reducing temperature for UE in accordance with an exemplary embodiment, As shown in FIG. 8B, based on the embodiment shown in FIG. 7, the device may further include a second returning module 75.

The second returning module 75 is configured to, after the first sending module 72 sends the first configuration information to the target UE based on the handover request, return a handover request acknowledge message that carries the first configuration information to the source base station.

After sending the first configuration information to the target UE, the target base station may inform the source base station of the configuration by the target base station to the overheated target UE through the handover request acknowledge message.

In the foregoing embodiment, the handover request response message is returned to the source base station to inform the source base station of the configuration by the target base station to the overheated target UE.

Figure 8C:
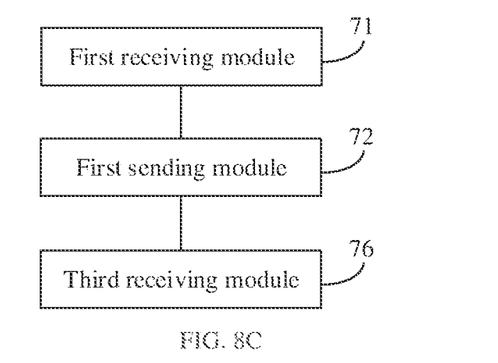
FIG. 8C is a block diagram of a device for reducing temperature for UE in accordance with an exemplary embodiment.

FIG. 8C is a block diagram of a device for reducing temperature for UE in accordance with an exemplary embodiment. As shown in FIG. 8C, based on the embodiment shown in FIG. 7, the device may further include a third receiving module 76.

The third receiving module 76 is configured to, after the first sending module 77 sends the first configuration information to the target UE based on the handover request, receive an RRC message sent by the target UE. The RRC message carries identification information indicating that the target UE does not overheat.

After the problem of overheating is solved, the target UE may send the identification information indicating that the target UE does not overheat to the target base station through the RRC message to inform the target base station that the problem of overheating is solved.

In the foregoing embodiment, the identification information indicating that the target UE does not overheat may be sent to the target base station through the RRC message to inform the target base station that the problem of overheating is solved.

Figure 9:
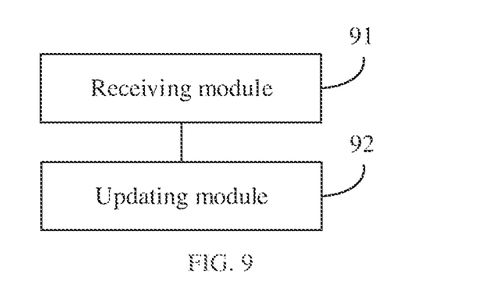
FIG. 9 is a block diagram of a device for reducing temperature for UE in accordance with an exemplary embodiment.

FIG. 9 is a block diagram of a device for reducing temperature for UE in accordance with an exemplary embodiment. As shown in FIG. 9, the device includes a receiving module 91 and an updating module 92.

The receiving module 91 is configured to receive first configuration information sent by a target base station.

After receiving the handover request sent by a source base station, the target base station may send the first configuration information to target UE based on information carried in a handover request.

The updating module 92 is configured to update radio communication parameter configuration of UE based on the first configuration information to reduce temperature for the UE.

The target UE may update its own radio communication parameter configuration after receiving the first configuration information to reduce its own temperature. Thus, such problems as service interruption or UE restart caused by overheating of the UE may be avoided.

In the foregoing embodiment, the first configuration information sent by the target base station is received, and the radio communication parameter configuration of the UE is updated based on the first configuration information to reduce temperature for the UE, such that problems caused by overheating of the UE may be avoided.

Figure 10A:
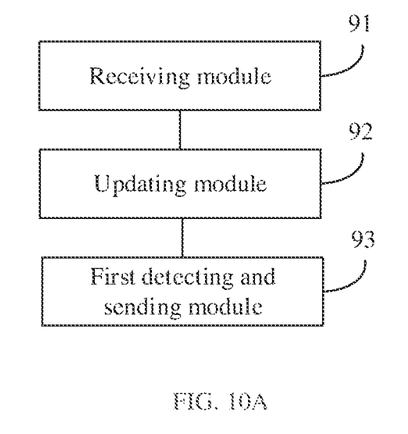
FIG. 10A is a block diagram of a device for reducing temperature for UE in accordance with an exemplary embodiment.

FIG. 10A is a block diagram of a device for reducing temperature for UE in accordance with an exemplary embodiment. As shown in FIG. 10A, based on the embodiment shown in FIG. 9, the device may further include a first detecting and sending module 93.

The first detecting and sending module 93 is configured to, after the updating module 92 updates the radio communication parameter configuration of the UE based on the first configuration information, send an RRC message to the target base station if it is detected that the UE does not overheat. The RRC message carries identification information indicating that the UE does not overheat.

In this embodiment, after it is detected that the UE does not overheat, the identification information indicating that the UE does not overheat may be sent to the target base station through the RRC message to inform the target base station that the problem of overheating is solved.

Figure 10B:
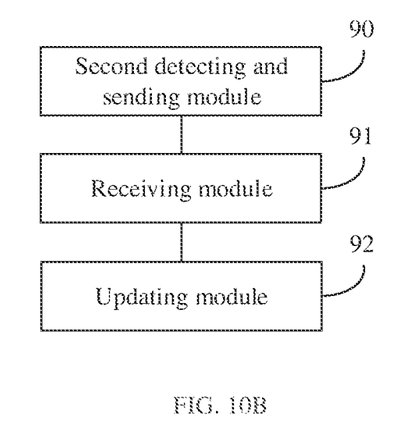
FIG. 10B is a block diagram of a device for reducing temperature for UE in accordance with an exemplary embodiment.

FIG. 10B is a block diagram of a device for reducing temperature for UE in accordance with an exemplary embodiment. As shown in FIG. 10B, based on the embodiment shown in FIG. 9, the device may further include a second detecting and sending module 90.

The second detecting and sending module 90 is configured to, before the receiving module 91 receives the first configuration information sent by, the target base station, send at least one of configuration information expected by the UE and identification information indicating that the UE overheats to a source base station in communication connection with the target base station if it is detected that the UE overheats.

Overheating of the target UE may present in various forms. For example, the temperature of the UE is higher than a preset temperature, or the temperature of the UE is higher than the preset temperature and lasts for a period of time.

In this embodiment, after it is detected that the UE overheats, at least one of the configuration information expected by the UE and the identification information indicating that the UE overheats may be sent to the source base station, such that when the source base station sends the handover request to the target base station, a handover request may carry at least one of the configuration information expected by the UE and the identification information indicating that the UE overheats. Thus, a condition is provided for the target base station to send the first configuration information to the UE so as to reduce temperature for the UE.

Figure 11:
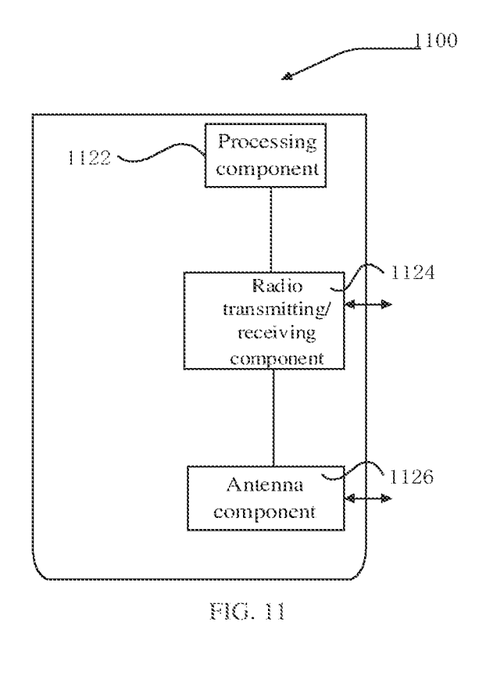
FIG. 11 is a block diagram of a device for reducing temperature for UE in accordance with an exemplary embodiment.

FIG. 11 is a block diagram of a device 1100 for reducing temperature for UE in accordance with an exemplary embodiment. The device 1100 may be provided as a base station. Referring to FIG. 11, the device 1100 includes a processing component 1122, a radio transmitting/receiving component 1124, an antenna component 1126, and a signal processing portion peculiar to a radio interface. The processing component 1122 may further include one or more processors configured to: receive a handover request sent by a source base station, wherein the handover request carries at least one of configuration information expected by target UE and indication information indicating that the target UE overheats; and send first configuration information to the target UE based on the handover request, wherein the first configuration information is configured for the target UE to update its own radio communication parameter configuration so as to reduce its own temperature, and the first configuration information may be the same as or different from the configuration information expected by the target UE.

Figure 12:
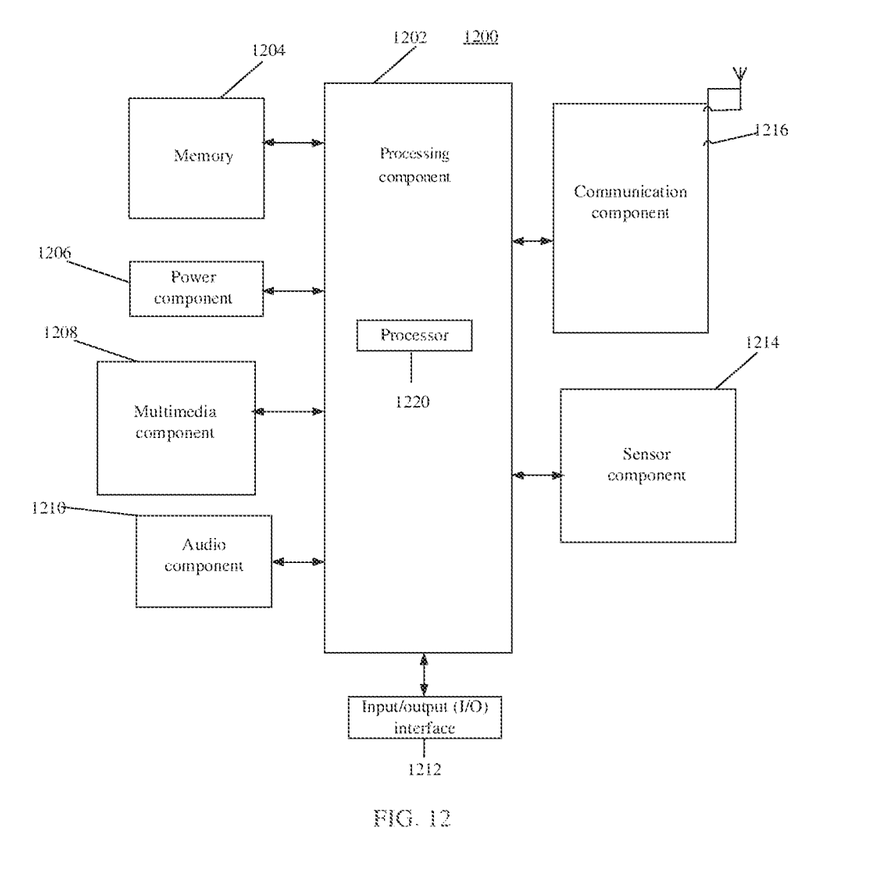
FIG. 12 is a block diagram of a device for reducing temperature for UE in accordance with an exemplary embodiment.

FIG. 12 is a block diagram of a device 1200 for reducing temperature for UE in accordance with an exemplary embodiment. For example, the device 1200 may be UE, a mobile phone, a computer, a digital broadcast terminal, a messaging device, a gaming console, a tablet device, a medical device, a fitness equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, videos, etc. The memory 1204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action, In some embodiments, the multimedia component 1208 includes a front camera and/or a rear camera. The front camera and the rear camera may receive external multimedia data while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive external audio signals when the device 1200 is in an operation mode, such as a call mode, a recording mode, and a voice recognition mode. The received audio signal may be further stored in he memory 1204 or transmitted via the communication component 1216. In some embodiments, the audio component 1210 further includes a speaker for outputting audio signals.

The I/O interface 1212 provides an interface between the processing component 1202 and peripheral interface modules, such as a keyboard, a click wheel, buttons, and the like. The buttons may include, but are not limited to, a home button, a volume button, a start button, and a lock button.

The sensor component 1214 includes one or more sensors to provide status assessments of various aspects of the device 1200. For instance, the sensor component 1214 may detect an on/off status of the device 1200, relative positioning of components, e.g., the display device and the mini keyboard of the device 1200, and the sensor component 1214 may also detect a position change of the device 1200 or a component of the device 1200, presence or absence of user contact with the device 1200, orientation or acceleration/deceleration of the device 1200, and temperature change of the device 1200. The sensor component 1214 may include a proximity sensor configured to detect the presence of nearby objects without any physical contact. The sensor component 1214 may also include a light sensor, such as a CMOS or CCD image sensor, used for imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 4G, or 5G, or a combination thereof. In an exemplary embodiment, the communication component 1216 receives broadcast signals or broadcast associated information from an external broadcast management system via a broadcast channel. In an exemplary embodiment, the communication component 1216 further includes a near field communication (NFC) module to facilitate short-range communications. In an exemplary embodiment, the communication component 1216 may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 1204 including instructions, executable by the processor 1220 in the device 1200, for performing the above-described methods. For example, the non-transitory computer-readable storage medium may be a ROM, a RAM a CD-ROM, a magnetic tape, a floppy disc, an optical data storage device, and the like.

The device embodiments described above are merely illustrative, wherein modules illustrated as separate components may or may not be physically separate, for example, the modules may be in one place or distributed on multiple networks. Part or all of the modules may be selected according to actual needs to achieve the purpose of the solutions of the device embodiments.

It should be noted that, in the present disclosure, relational terms such as first and second are used merely to distinguish one entity or operation from another entity or operation, and do not necessarily require or imply any actual relationship or order between these entities or operations. The term "comprising", "including" or any other variants thereof is intended to cover a non-exclusive inclusion, such that a process, method, article or device that includes a series of elements includes not only those elements but also other elements that are not specifically listed, or further includes elements that arc inherent to such a process, method, item or device. An element that is defined by the phrase "including a . . . " does not exclude the presence of additional equivalent elements in the process, method, item or device that includes the element.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reducing temperature for user equipment (UE), comprising:
   receiving a handover request from a source base station through an X2 interface, wherein the handover request carries at least one of configuration information expected by the UE and indication information indicating that the UE overheats; and
   sending first configuration information to the UE based on the handover request, wherein the first configuration information is configured for the UE to update its own radio communication parameter configuration to reduce the temperature of the UE, and the first configuration information is the same as or different from the configuration information expected by the UE.

2. The method according to claim 1, prior to receiving the handover request from the source base station, further comprising:
   receiving an X2 interface setup request from the source base station, wherein the X2 interface setup request carries capability information indicating that the source base station is capable of reducing temperature for the UE by updating the configuration information; and
   transmitting an X2 interface setup response to the source base station to establish the X2 interface, wherein the X2 interface setup response carries capability information indicating that a target base station is capable of reducing temperature for the UE by updating the configuration information.

3. The method according to claim 1, after sending the first configuration information to the UE based on the handover request, further comprising:
   transmitting a handover request acknowledge message that carries the first configuration information to the source base station.

4. The method according to claim 1, after sending the first configuration information to the UE based on the handover request, further comprising:
   receiving a radio resource control (RRC) message from the UE, wherein the RRC message carries identification information indicating that the UE does not overheat.

5. A method for reducing temperature for UE, comprising:
   receiving first configuration information from a target base station; and
   updating radio communication parameter configuration of the UE based on he first configuration information to reduce temperature for the UE;
   wherein the target base station sends the first configuration information to the UE by receiving a handover request from a source base station through an X2 interface, wherein the handover request carries at least one of configuration information expected by the UE and indication information indicating that the UE overheats.

6. The method according to claim 5, after updating the radio communication parameter configuration of the UE based on the first configuration information, further comprising:
   sending a radio resource control (RRC) message to the target base station if it is detected that the UE does not overheat, wherein the RRC message carries identification information indicating that the UE does not overheat.

7. The method according to claim 5, prior to receiving the first configuration information from the target base station, further comprising:

when it is detected that the UE overheats, sending the at least one of the configuration information expected by the UE and the identification information indicating that the UE overheats to the source base station, the source base station establishing a communication connection with the target base station.

8. A first base station, comprising:

a processor; and a memory configured to store an instruction executable by the processor, wherein the processor is configured to:

receive a handover request from a second base station as a source base station through an X2 interface, wherein the handover request carries at least one of configuration information expected by UE and indication information indicating that the UE overheats; and send first configuration information to the UE based on the handover request, wherein the first configuration information is configured for the UE to update its own radio communication parameter configuration for reducing a temperature of the UE, and the first configuration information is the same as or different from the configuration information expected by the UE.

9. The first base station according to claim 8, prior to receiving the handover request from the source base station, the processor being further configured to:

receive an X2 interface setup request from the source base station, wherein the X2 interface setup request carries capability information indicating that the source base station is capable of reducing temperature for the UE by updating the configuration information; and transmit an X2 interface setup response to the source base station to establish the X2 interface, wherein the X2 interface setup response carries capability information indicating that the first base station is capable of reducing temperature for the UE by updating the configuration information.

10. The first base station according to claim 8, after sending the first configuration information to the UE based on the handover request, the processor being further configured to:

transmit a handover request acknowledge message that carries the first configuration information to the source base station.

11. The first base station according to claim 8, after sending the first configuration information to the UE based on the handover request, the processor being further configured to:

receive a radio resource control (RRC) message from the UE, wherein the RRC message carries identification information indicating that the UE does not overheat.

12. User equipment (UE), comprising:

a processor; and a memory configured to store an instruction executable by the processor, wherein the processor is configured to:

receive first configuration information from a target base station; and update radio communication parameter configuration of the UE based on the first configuration information to reduce temperature for the UE;

wherein the target base station sends the first configuration information to the UE by receiving a handover request from a source base station through an X2 interface, wherein the handover request carries at least one of configuration information expected by the UE and indication information indicating that the UE overheats.

13. The UE according to claim 12, after updating the radio communication parameter configuration of the UE based on the first configuration information, the processor being further configured to:

send a radio resource control (RRC) message to the target base station if it is detected that the UE does not overheat, wherein the RRC message carries identification information indicating that he UE does not overheat.

14. The UE according to claim 12, prior to receiving the first configuration information from the target base station, the processor being further configured to:

when it is detected that the UE overheats, send the at least one of configuration information expected by the UE and the identification information indicating that the UE overheats to the source base station, the source base station establishing a communication connection with the target base station.

* * * * *